(12) United States Patent
Fournier

(10) Patent No.: US 6,231,100 B1
(45) Date of Patent: May 15, 2001

(54) MODIFIED TRUCK GATE

(75) Inventor: Daniel James Fournier, Lake Orion, MI (US)

(73) Assignee: Fournier Enterprises, Inc., Troy, MI (US)

( * ) Notice: Subject to any disclaimer, the term of this patent is extended or adjusted under 35 U.S.C. 154(b) by 0 days.

(21) Appl. No.: 09/228,449

(22) Filed: Jan. 11, 1999

(51) Int. Cl.[7] .................................................. B62D 25/00
(52) U.S. Cl. ............................ 296/57.1; 296/50; 296/181
(58) Field of Search .............................. 296/57.1, 50, 181

(56) References Cited

U.S. PATENT DOCUMENTS

| | | |
|---|---|---|
| D. 327,465 | 6/1992 | Word et al. . |
| D. 352,264 | 11/1994 | Montgomery . |
| 4,136,905 * | 1/1979 | Morgan ................................ 296/57.1 |
| 4,743,058 | 5/1988 | Fedrigo . |
| 4,861,093 | 8/1989 | Chapman . |
| 4,902,066 * | 2/1990 | Norman ............................... 296/57.1 |
| 4,932,705 * | 6/1990 | Miller ....................................... 296/50 |
| 5,110,172 * | 5/1992 | Ney et al. ............................... 296/50 |
| 5,324,092 * | 6/1994 | Burg ......................................... 296/50 |
| 5,518,286 | 5/1996 | McCormack . |
| 5,597,195 * | 1/1997 | Meek .................................... 296/57.1 |
| 5,605,367 * | 2/1997 | McCormack ........................ 296/57.1 |
| 5,727,838 * | 3/1998 | Vallerand ............................ 296/57.1 |
| 5,741,039 * | 4/1998 | Habdas ................................ 296/57.1 |
| 5,755,480 * | 5/1998 | Bryan .................................. 296/57.1 |
| 5,765,892 * | 6/1998 | Covington ........................... 296/57.1 |

* cited by examiner

Primary Examiner—Joseph D. Pape
Assistant Examiner—Kiran Patel
(74) Attorney, Agent, or Firm—Young & Basile, P.C.

(57) ABSTRACT

An improved tailgate for use on a vehicle and pivotally connected to a cargo area of the vehicle. The tailgate has an inner surface exposed to the cargo area and an outer surface spaced from the inner surface. The tailgate has a center open area defined by an upper edge, a lower edge, and side edges. Tubular bars extend within the center open area and connected to at least two of the edges. The bars are positioned such that an exposed surface of each bar is planar to the inner surface of the tailgate to provide a level surface when the tailgate is in the horizontal position to provide a working surface.

7 Claims, 2 Drawing Sheets

MODIFIED TRUCK GATE

FIELD OF THE INVENTION

The invention relates to tailgates for pickup trucks.

BACKGROUND OF THE INVENTION

Many vehicles, particularly pickup trucks, are provided with cargo areas for storage of work equipment and other articles which are located rearward of a passenger compartment. Most of these vehicles that include cargo areas are provided with a tailgate in the form of a panel which is pivotally mounted to the rearmost portion of the cargo area. When the tailgate is pivoted in a downward or open position, the panel is in a horizontal position. When the tailgate is in-use or closed, the panel is vertically positioned to form one side of the perimeter of a cargo area. When the tailgate panel is in the in-use or vertical position, the tailgate panel results in a significant amount of turbulence and drag on the vehicle. The turbulence and drag on the vehicle results in lower fuel efficiency of the vehicle.

In addition, many owners of pickup truck vehicles install cabs over the cargo area in order to at least partially protect the contents from the outside elements. In particular, many of these owners may wish to transport pets or other small animals in the cargo area and thereby allow the animals to receive adequate ventilation as well as visibility outside of the cargo area.

Further, many owners of pickup trucks use their trucks as a portable office. The owners may use the tailgate when in the horizontal position as a table or temporary storage area for items such as toolboxes and the like.

Although various configurations have been proposed for the tailgates to minimize the resistance or drag on the vehicle, none of the prior art disclose a tailgate configuration that provides ventilation and visibility for animals held in the cargo area and provides an essentially flat surface when the tailgate is in the horizontal position as well as minimizes the drag on the vehicle.

It is therefore desirable to provide a tailgate modification that addresses the three aforementioned concerns.

SUMMARY OF THE INVENTION

The current invention provides a tailgate that can either be retrofitted to an existing tailgate or produced during the manufacture of the tailgate. The tailgate has a central open area having tubular rods or bars that span the center open area of the tailgate. The rods are orientated preferably in a vertical position when the tailgate is in the in-use or vertical position, but the rods may span diagonally or horizontally across the center open area of a tailgate. The rods are secured to the peripheral edges of the open area and are positioned in the center open area such that a portion of each rod is on the same plane as the inside surface of the tailgate.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
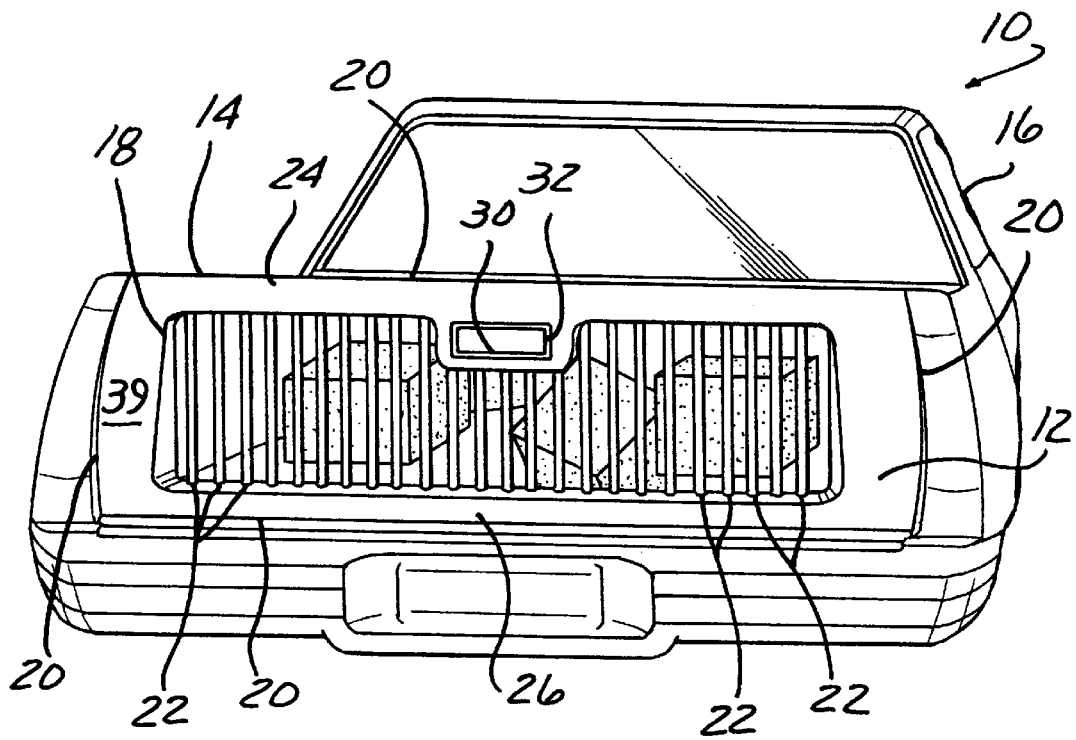
FIG. 1 is a rear view of a tailgate of the present invention.

Referring to the drawings, the present invention is designed for use on a pickup truck vehicle 10 for modification to an existing tailgate 12 or installed as original equipment. The pickup truck 10 may have an open top or enclosed cargo carrying compartment 14 formed behind the vehicle cabin 16. The tailgate 12 uses a conventional latch mechanism which includes a handle 30 mounted in a housing 32 centrally secured in the tailgate 12. A pair of cables 34 extend from rear side portions 36 of the cargo carrying compartment 14 to support the tailgate 12 when in the down and horizontal position. The tailgate is modified so that a center portion 18 located away from the peripheral edges 20 of the tailgate 12 is removed. The center portion cut-out 18 may be any desired design and may include emblems or other significant symbols representing special meaning to the owner of the vehicle 10. The cut-out center portion 18 is then replaced with a plurality of vertical rods 22 spaced in a linear formation. The rods 22 are preferably vertical when the tailgate 12 is in the vertical and closed position. Each vertical rod 22 has one end attached to the top horizontal edge 24 of the tailgate. The other end of the rod is attached to the bottom horizontal edge 26 of the tailgate. The means for attachment may include welding, bolts or other known attachments. The plurality of vertical cylindrical rods 22 are preferably formed from steel tubes and are set equidistantly spaced from each other. The spacing between the rods 22 are a few inches such that small items or small animals cannot slip through between the rods 22. In addition, although the rods 22 are preferably vertically disposed in the center cut-out 18, the rods 22 may be horizontally or diagonally disposed therein. The rods 22 are preferably vertically disposed to provide structural strength and to minimize assembly time.

Figure 2:
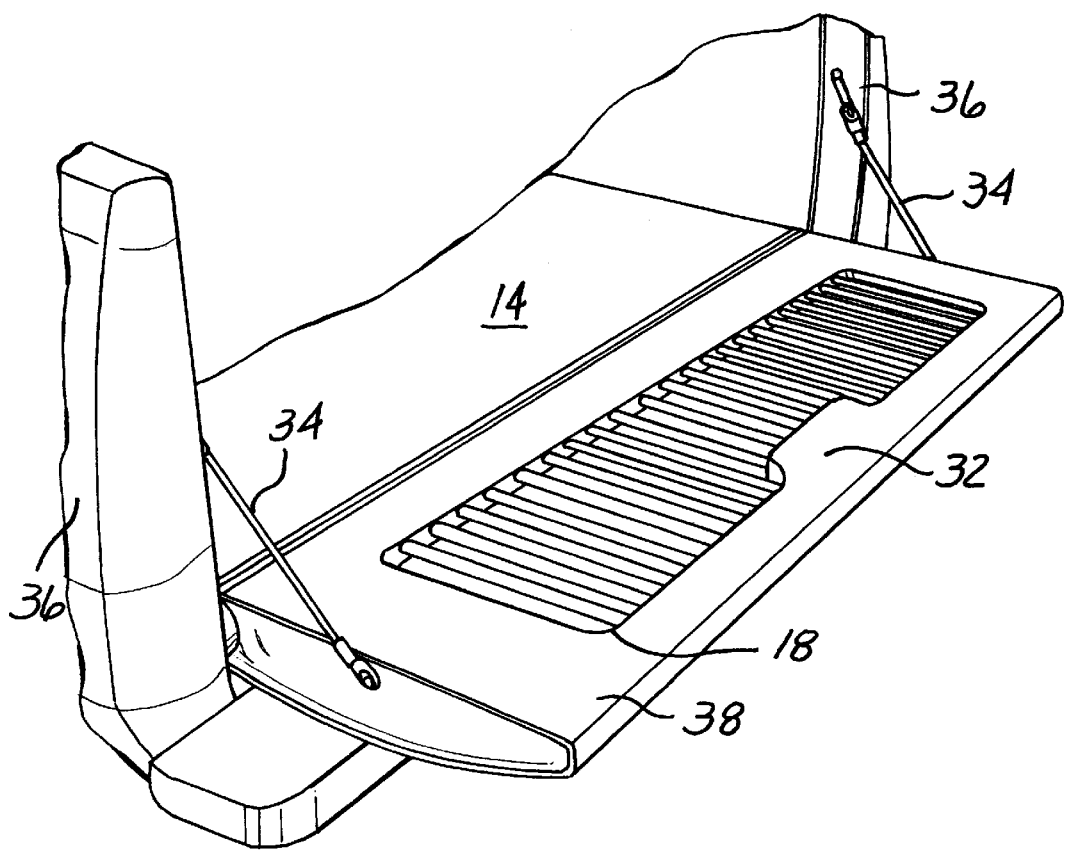
FIG. 2 is a side perspective view of the tailgate in the down position.
Figure 3:
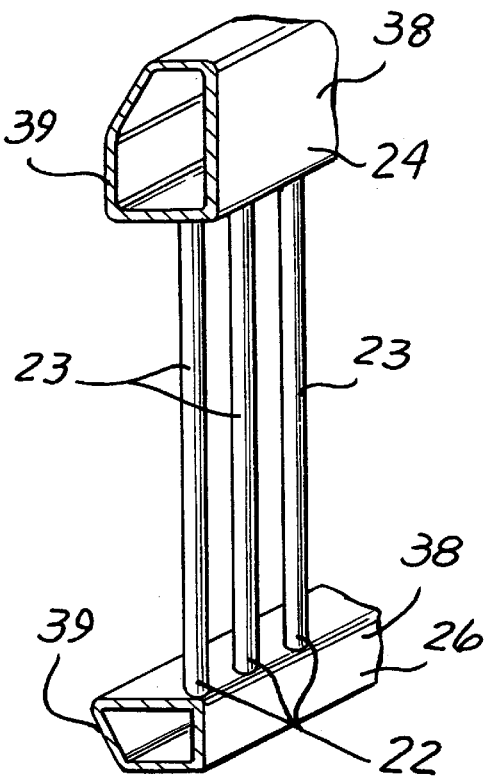
FIG. 3 is a sectional view of the truck gate.

Looking at FIGS. 2 and 3, it is evident that the steel rods 22 are narrower or have a smaller diameter than the thickness of the tailgate 12. The rods 22 are aligned between the top and bottom horizontal edges, 24 and 26 respectively, of the tailgate 12 such that an inner portion 23 of each rod 22 lies in the same plane as the interior surface 38 of the tailgate 12. In other words, the rods 22 are positioned in parallel to each other such that they are adjacent to the innermost surface 38 of the tailgate and spaced away from the exterior surface 39 of the tailgate 12. This positioning of the rods 22 provides an essentially flat surface such that when the tailgate is in the open position and the truck is stopped, items such as tool boxes, or other relatively small items may be temporarily stored on the level surface at a job site or other required environment.

Therefore, the invention provides the advantage of reducing wind resistance when the tailgate 12 is in the up position and the truck 10 is in motion. It further provides a means for air circulation for animals that may be hauled in the cargo carrying compartment, especially when a top encloses the compartment 14. Finally, the modified tailgate 12 provides an essentially flat level inner surface 38 when the tailgate 12 is in the down position so that workers and others may place items such as blueprints, toolboxes and tools on the interior surface 38 of the tailgate 12.

Figure 4:
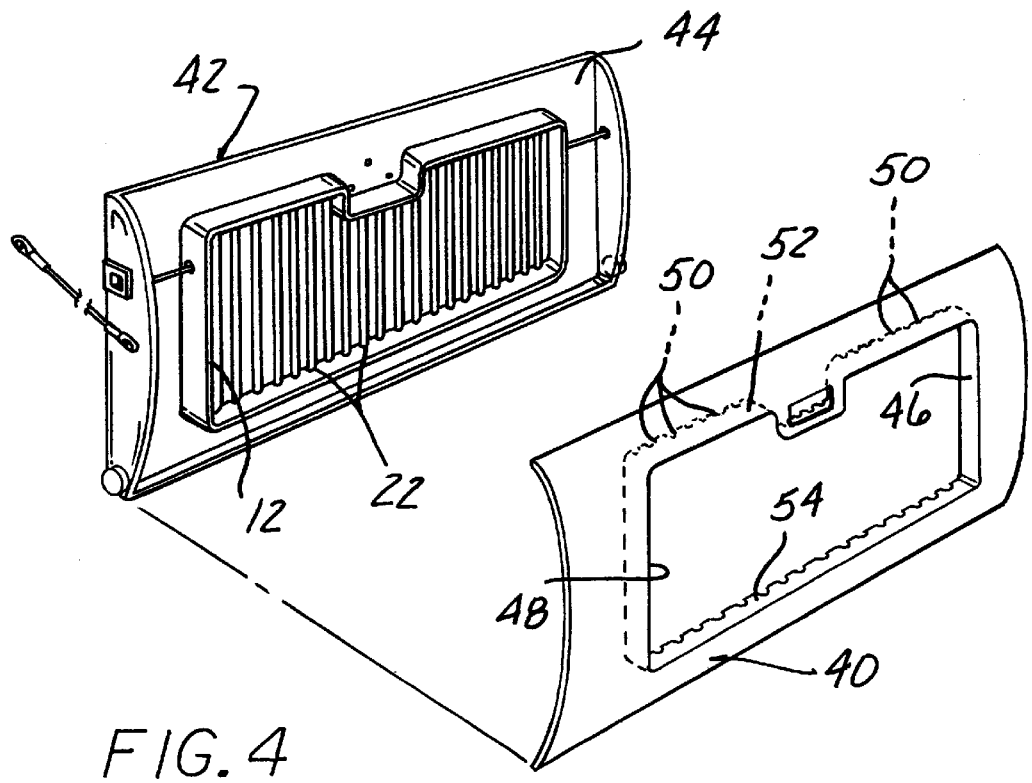
FIG. 4 is an exploded view of inner and outer panels of the tailgate.

Another enhancement to a modified or original equipment tailgate is shown in FIG. 4 where the tailgate includes an outer panel portion 40 and an inner panel portion 42. The outer panel portion 40 is made of a plastic material which is bonded, glued, or otherwise secured to the inner panel 42 made of a strengthening material such as steel. The combination of materials provides functionality, strength as well as manufacturing cost savings. As seen in FIG. 4, the outer panel portion 40 is essentially a skin to envelope the hollow interior 44 of the inner steel panel 42. The outer panel portion 40 has a corresponding center cut-out 48 to the cut-out 18 of the tailgate 12. Around the entire periphery of center cut-out 48, there is a rearward extending flange 46 to cover the inner periphery of cut-out 18. Notches 50 are formed in the upper horizontal and lower horizontal portions 52, 54 respectively of flange 46 and configured to receive a portion of the rods 22 in order that the flange 46 lays flush with the entire periphery of the cut-out 18.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a motor vehicle having a passenger compartment and a cargo area, the cargo area partially enclosed by a tailgate panel with an upper edge and a lower edge, said tailgate panel pivotally mountable to the cargo area along the lower edge, said tailgate panel having a predetermined thickness and an inner surface exposed to the cargo area, and an opposing outer surface, the improvement comprising:

the tailgate panel having a center open area with a periphery defined by at least three contiguous edges and a plurality of rigid cylindrical tubular rods extending through the open area with one end of each rigid cylindrical tubular rods attached to one edge and the other end of each rod attached to another edge wherein said rods are in parallel configuration and spaced from each other and each cylindrical tubular rod having an outer surface coplanar with the inner surface of the tailgate panel, wherein the tubular rods have a thickness less than the thickness of the tailgate panel.

2. The improved tailgate of claim 1, wherein a surface portion of each rod is on the same plane as the inner surface.

3. The improved tailgate of claim 1, wherein the rods are spaced a few inches from each other to prevent pass through of small animals and small articles.

4. The improved tailgate of claim 1 wherein the the improvement further comprising a plastic skin attached to the tailgate panel and facing the outer surface of the tailgate panel and forming a hollow interior therebetween, wherein said plastic skin has a cut-out region corresponding to the center open area of the tailgate panel.

5. The improved tailgate of claim 4, wherein the plastic skin has notches for receiving portions of the rods therein.

6. The improved tailgate of claim 1, wherein the rods are disposed in the center open area in a vertical position when said tailgate panel is in a vertical position.

7. The improved tailgate of claim 1, wherein the center open area of the tailgate panel has a periphery defined by multiple walls adjacently disposed and intersecting at ends and said rods have ends, wherein said rod ends are secured to at least two walls.

\* \* \* \* \*